(12) United States Patent
Kang et al.

(10) Patent No.: US 9,031,036 B2
(45) Date of Patent: May 12, 2015

(54) APPARATUS AND METHOD FOR SUPPORTING INTRA-BASE STATION HANDOVER IN A MULTI-HOP RELAY BROADBAND WIRELESS COMMUNICATION SYSTEM

(75) Inventors: Hyun-Jeong Kang, Seoul (KR); Jung-Je Son, Yongin-si (KR); Young-Kyo Baek, Seoul (KR); Taori Rakesh, Suwon-si (KR); Young-Bin Chang, Anyang-si (KR)

(73) Assignee: Samsung Electronically Co., Ltd., Suwon-Si (KR)

( * ) Notice: Subject to any disclaimer, the term of this patent is extended or adjusted under 35 U.S.C. 154(b) by 697 days.

(21) Appl. No.: 12/658,671

(22) Filed: Feb. 12, 2010

(65) Prior Publication Data
US 2010/0208692 A1 Aug. 19, 2010

(30) Foreign Application Priority Data
Feb. 13, 2009 (KR) ........................ 10-2009-0011767

(51) Int. Cl.
*H04W 4/00* (2009.01)
*H04W 36/00* (2009.01)
*H04W 84/04* (2009.01)

(52) U.S. Cl.
CPC ........ *H04W 36/0055* (2013.01); *H04W 84/047* (2013.01)

(58) Field of Classification Search
CPC ..... H04L 43/06; H04L 43/062; H04L 43/065; H04W 8/18; H04W 8/22; H04W 24/10; H04W 36/005–36/0094; H04W 36/08–36/12; H04W 36/16–36/22; H04W 36/30

USPC ................... 370/331; 455/436–440, 443, 444
See application file for complete search history.

(56) References Cited

U.S. PATENT DOCUMENTS

2005/0232212 A1\* 10/2005 Kang et al. ................... 370/338
(Continued)

FOREIGN PATENT DOCUMENTS

| EP | 1775984 A2 | 4/2007 |
| KR | 2007 0108038 A | 11/2007 |
| WO | WO 2007/078138 A2 | 7/2007 |

OTHER PUBLICATIONS

International Search Report dated Sep. 27, 2010 in connection with International Patent Application No. PCT/KR2010/000903.
(Continued)

*Primary Examiner* — Peter Cheng

(57) ABSTRACT

An apparatus is capable of supporting an intra-BS handover of a Mobile Station (MS) that can distinguish a Relay Station (RS) and a Base Station (BS) in a multi-hop relay broadband wireless communication system. A handover of an MS in a multi-hop relay wireless communication system includes receiving a neighbor advertisement message. When a handover command message that initiates a handover to a target node is received, information on a target node is acquired, and an upper BS of the target node is identified. When the identified upper BS of the target node is the same as an upper BS of the serving node, control information that has been previously used in a serving node is used in the target node, and communication with the target node is performed.

10 Claims, 8 Drawing Sheets

(56) References Cited

U.S. PATENT DOCUMENTS

| | | |
|---|---|---|
| 2007/0003062 A1* | 1/2007 | Mizikovsky et al. ......... 380/270 |
| 2007/0086387 A1 | 4/2007 | Kang et al. |
| 2007/0104148 A1 | 5/2007 | Kang et al. |
| 2008/0056218 A1* | 3/2008 | Binzel et al. .................. 370/342 |
| 2008/0085709 A1 | 4/2008 | Jeon et al. |
| 2009/0271626 A1* | 10/2009 | Wang ............................ 713/170 |
| 2011/0111753 A1* | 5/2011 | Vainikka et al. .............. 455/425 |
| 2012/0231796 A1* | 9/2012 | Meylan et al. ................ 455/436 |
| 2013/0295840 A1* | 11/2013 | Phan et al. ........................ 455/7 |

OTHER PUBLICATIONS

Written Opinion of the International Searching Authority dated Sep. 27, 2010 in connection with International Patent Application No. PCT/KR2010/000903.

Translated Korean Office Action dated Feb. 22, 2015 in connection with Korean Patent Application No. 10-2009-0011767; 9 pages.

* cited by examiner

APPARATUS AND METHOD FOR SUPPORTING INTRA-BASE STATION HANDOVER IN A MULTI-HOP RELAY BROADBAND WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Feb. 13, 2009 and assigned Serial No. 10-2009-0011767, the contents of which are herein incorporated by reference.

TECHNICAL FIELD OF THE INVENTION

The present invention relates to a multi-hop relay broadband wireless communication system. More particularly, the present invention relates to an apparatus and method for supporting an intra-Base Station (BS) handover of a Mobile Station (MS) that can distinguish a Relay Station (RS) and a BS in a multi-hop relay broadband wireless communication system.

BACKGROUND OF THE INVENTION

In the Fourth Generation (4G) communication system, the next generation communication system, an active research has been conducted to provide users with services of various Qualities of Service (QoSs) that have data rates of about 100 Mbps. In particular, an active research has been conducted in the current 4G communication system to support high speed services that provide mobility and QoS for a Broadband Wireless Access (BWA) communication system such as a wireless Local Area Network (LAN) system and a wireless Metropolitan Area Network (MAN) system. The typical 4G communication systems are the Institute of Electrical and Electronics Engineers (IEEE) 802.16d communication system and the IEEE 802.16e communication system.

The IEEE 802.16d communication system and IEEE 802.16e communication system use an Orthogonal Frequency Division Multiplexing/Orthogonal Frequency Division Multiple Access (OFDM/OFDMA) scheme in the physical layer. The IEEE 802.16d communication system is a system that only considers a current fixed state of a Subscriber Station (SS) (i.e., a state that does not consider the mobility of the SS) and a single cell structure. Unlike this, the IEEE 802.16e communication system is a system that considers the mobility of an SS in the IEEE 802.16d communication system. An SS that has mobility can be referred to as a Mobile Station (MS).

FIG. 1 illustrates a schematic structure of a conventional IEEE 802.16e communication system.

Referring to FIG. 1, the IEEE 802.16e communication system has a multi-cell structure, namely a cell 100 and a cell 150. The IEEE 802.16e communication system includes a BS 110 that takes charge of the cell 100, a BS 140 that takes charge of the cell 150, and a plurality of MSs 111, 113, 130, 151, and 153. Signaling between the BSs 110 and 140 and the MSs 111, 113, 130, 151, and 153 are performed using the OFDM/OFDMA scheme. Among the MSs 111, 113, 130, 151, and 153, the MS 130 is positioned in a boundary area between the cells 100 and 150, i.e., in a handover area. Accordingly, if the MS 130 moves further into the cell 150 in the midst of transmitting/receiving a signal with the BS 110, a serving BS of the MS 130 changes from the BS 110 to the BS 140.

The conventional IEEE 802.16e communication system carries out signaling transmission/reception through a direct link between a fixed BS and an MS as illustrated in FIG. 1 and, thus, can easily build a wireless communication link of high reliability between the BS and the MS. However, because the BS is fixed in position, the IEEE 802.16e communication system has low flexibility in constructing a wireless network and, thus, has difficulty providing an efficient communication service in a wireless environment that experiences great changes in traffic distribution or required calls.

To overcome these disadvantages, a multi-hop relay type data forwarding scheme can be applied to a general cellular wireless communication system such as the IEEE 802.16e communication system, using fixed Relay Stations (RSs), mobile RSs, or general MSs. A multi-hop relay wireless communication system can quickly cope with a change of the communication environment and reconstruct a network, and can more efficiently manage the entire wireless network. For example, the multi-hop relay wireless communication system can extend a cell service area and enhance a system capacity. That is, when the channel between a BS and an MS is in poor condition, the multi-hop relay wireless communication system can install an RS between the BS and the MS and build a multi-hop relay path through the RS, thereby providing the MS with a wireless channel that has an excellent channel state. Also, by using a multi-hop relay scheme in a cell boundary area that has a poor channel state from the BS, the multi-hop relay wireless communication system can provide a higher-speed data channel, and can extend a cell service area.

An intra-BS handover process of an MS in the multi-hop relay wireless communication system is described below. First, the MS communicates through a serving node and acquires information on a neighbor RS or a neighbor BS through a neighbor advertisement message that is periodically received from the serving node. Here, the serving node of the MS can be either an RS or a BS that controls the MS. For example, the RS is described below. Even when the serving node of the MS is an RS, the MS is controlled by a serving BS of the RS. After that, the MS performs a signal level measurement operation for the serving node and the neighbor RS or the neighbor BS that can be a target node, and transmits the signal level measurement result to the serving node. Then, the serving node of the MS transmits the signal level measurement result to the BS that controls the MS. The BS then determines whether there is a need for the MS to handover to the target node on the basis of the signal level measurement result of the MS.

If a need exists for the MS to handover to the target node, the BS sends a handover command message to the MS, via the serving node of the MS, to handover to the target node. At this time, the MS generates a key to use in the target node from identifier (ID) information of the target node that is included in the handover command message, includes the generated key within a ranging request message to communicate with the target node, and sends the ranging request message including the generated key to the target node. The target node then forwards the ranging request message to the BS. The BS transmits ID information of the MS and the ID information of the target node to a gateway. Here, the gateway is defined as an entity that includes a function for managing information on the key to be used by the MS in the target node. The gateway generates and stores a key to be used by the MS in the target node using the ID information of the target node, and transmits the key to the BS. After that, in response to the ranging request message of the MS, the BS generates a ranging response message that includes a Connection ID (CID) to be used by the MS and the key to be used by the MS in the target node, and sends the ranging response message to the MS via the target node. The MS can then perform communication through the target node using the CID and the key.

In each handover, the MS performs a process of updating control information to use during communication. Here, the control information of the MS includes a station ID, service flow and connection setting information of the MS, information on a key to be used by the MS in a target node, and so forth. As above, even when an MS performs a handover within the same BS, the MS updates control information to use during communication, and performs communication in a target node using the updated control information. However, when an MS performs a handover within the same BS, if the MS can continue to communicate using control information that had previously been used in a serving node, even in a target node without updating the control information, the MS can be provided with a seamless service without having to perform an unnecessary procedure between the gateway and the BS.

Accordingly, there is a need for performing an intra-BS handover by an MS that can distinguish an RS and a BS and continues to use control information, which had previously been used by the MS in a communication with a serving node, during communication with a target node within the same BS in a multi-hop relay broadband wireless communication system.

SUMMARY OF THE INVENTION

To address the above-discussed deficiencies of the prior art, a primary aspect of the present invention is to substantially address the above problems and/or disadvantages and to provide the features that will be described below. Accordingly, one aspect of the present invention is to provide an apparatus and method for supporting an optimized intra-Base Station (BS) handover in a multi-hop relay broadband wireless communication system.

Another aspect of the present invention is to provide an apparatus and method for supporting an intra-BS handover of a Mobile Station (MS) that can distinguish a Relay Station (RS) and a BS in a multi-hop relay broadband wireless communication system.

Yet another aspect of the present invention is to provide an apparatus and method for, when an MS capable of distinguishing an RS and a BS performs an intra-BS handover, communicating with a target node while continuing to use a control information, which has previously been used by an MS during communication with a serving node, without changing the control information within the same BS in a multi-hop relay broadband wireless communication system.

The above aspects are achieved by providing an apparatus and method for supporting an intra-BS handover in a multi-hop relay broadband wireless communication system.

According to one aspect of the present invention, a method for handover of a Mobile Station (MS) in a multi-hop relay wireless communication system is provided. The method includes receiving a neighbor advertisement message, which includes information on at least one of a neighbor node and an upper Base Station (BS) that controls the neighbor node, from a serving node when a handover command message commanding a handover to a target node is received from the serving node; acquiring information on the target node using the handover command message; identifying an upper BS of the target node using the acquired information on the target node and the information on at least one neighbor node and the upper BS that controls the neighbor node; and, when the identified upper BS of the target node is the same as an upper BS of the serving node, using control information, which has previously been used in the serving node, in the target node and performing a communication with the target node.

According to another aspect of the present invention, a method for a BS to support a handover of an MS in a multi-hop relay wireless communication system is provided. The method includes sending a handover command message, which commands the MS to handover to a target node, to the MS through a serving node of the MS when a ranging request message is received from the MS through the target node; determining whether an information on a key included the ranging request message has ever been used by the MS in a communication with the serving node; and, upon determining that the information on the key included in the ranging request message has been used by the MS in the communication with the serving node, sending a ranging response message to the MS through the target node without exchanging control information of the MS with a gateway.

According to yet another aspect of the present invention, a method for handover of an MS in a multi-hop relay wireless communication system is provided. The method includes receiving a handover command message for initiating a handover to a target node, from a serving node; determining whether the handover is an intra-BS handover using an indicator included in the handover command message, the indicator indicating whether the handover is the intra-BS handover; and, upon determining that the handover is the intra-BS handover, using control information, which has previously been used in the serving node, in the target node and performing a communication with the target node.

According to yet another aspect of the present invention, a method for a BS to support a handover of an MS in a multi-hop relay wireless communication system is provided. The method includes, upon determining a need for the MS to handover to a target node, determining whether the target node exists within the same BS; setting an indicator indicating whether the handover is an intra-BS handover depending on the determination result; and generating a handover command message including the set indicator.

According to yet another aspect of the present invention, an apparatus for handover of an MS in a multi-hop relay wireless communication system is provided. The apparatus includes a serving node and an MS. The serving node sends to the MS a neighbor advertisement message, which includes information on at least one of a neighbor node and an upper Base Station (BS) that controls the neighbor node, and sends to the MS a handover command message to initiate a handover to a target node. The MS receives the neighbor advertisement message from the serving node to acquire information on at least one of the neighbor node and the upper BS that controls the neighbor node; receives the handover command message from the serving node to acquire information on the target node; identifies an upper BS of the target node using the acquired information on the target node and the information on at least one of the neighbor node and the upper BS that controls the neighbor node. When the identified upper BS of the target node is the same as an upper BS of the serving node, the MS uses control information, which has previously been used in the serving node, in the target node and performs a communication with the target node.

According to still yet another aspect of the present invention, an apparatus for handover of an MS in a multi-hop relay wireless communication system is provided. The apparatus includes a serving node and an MS. The serving node sends to the MS a handover command message to initiate a handover to a target node. When the handover command message is received, the MS determines whether the handover is an intra-BS handover using an indicator included in the received handover command message. Upon determining that the handover is the intra-BS handover, the MS uses control information, which has previously been used in the serving node, in the target node and performs a communication with the target node. The indicator indicates whether the handover is the intra-BS handover.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its features, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

An apparatus and method for supporting an intra-BS handover of a Mobile Station (MS) that can distinguish a Relay Station (RS) and a Base Station (BS) in a multi-hop relay broadband wireless communication system are described below. Here, the assumption is that, even when a serving node of the MS is the RS, a control of the MS is carried out by a serving BS of the RS.

The RS can be an infrastructure RS that a service provider installs, and thus a BS previously has knowledge and manages, or a client RS that operates as a Subscriber Station (SS) (or MS) or an RS depending on the circumstances. Also, the RS can be a non-mobile, fixed RS, a nomadic RS (such as a notebook computer) having a nomadic characteristic, or a mobile RS having mobility like the MS or mounted in a moving vehicle.

Also, the multi-hop relay broadband wireless communication system is, for example, an Orthogonal Frequency Division Multiplexing/Orthogonal Frequency Division Multiple Access (OFDM/OFDMA) communication system. Using an OFDM/OFDMA scheme, the multi-hop relay broadband wireless communication system can enable high-speed data transmission, by transmitting a physical channel signal using a plurality of subcarriers, and support the mobility of an MS through a multi-cell structure. A broadband wireless access communication system is, for example, described below, but an embodiment of the present invention is also applicable to other multi-hop relay cellular-based communication systems.

Figure 1:
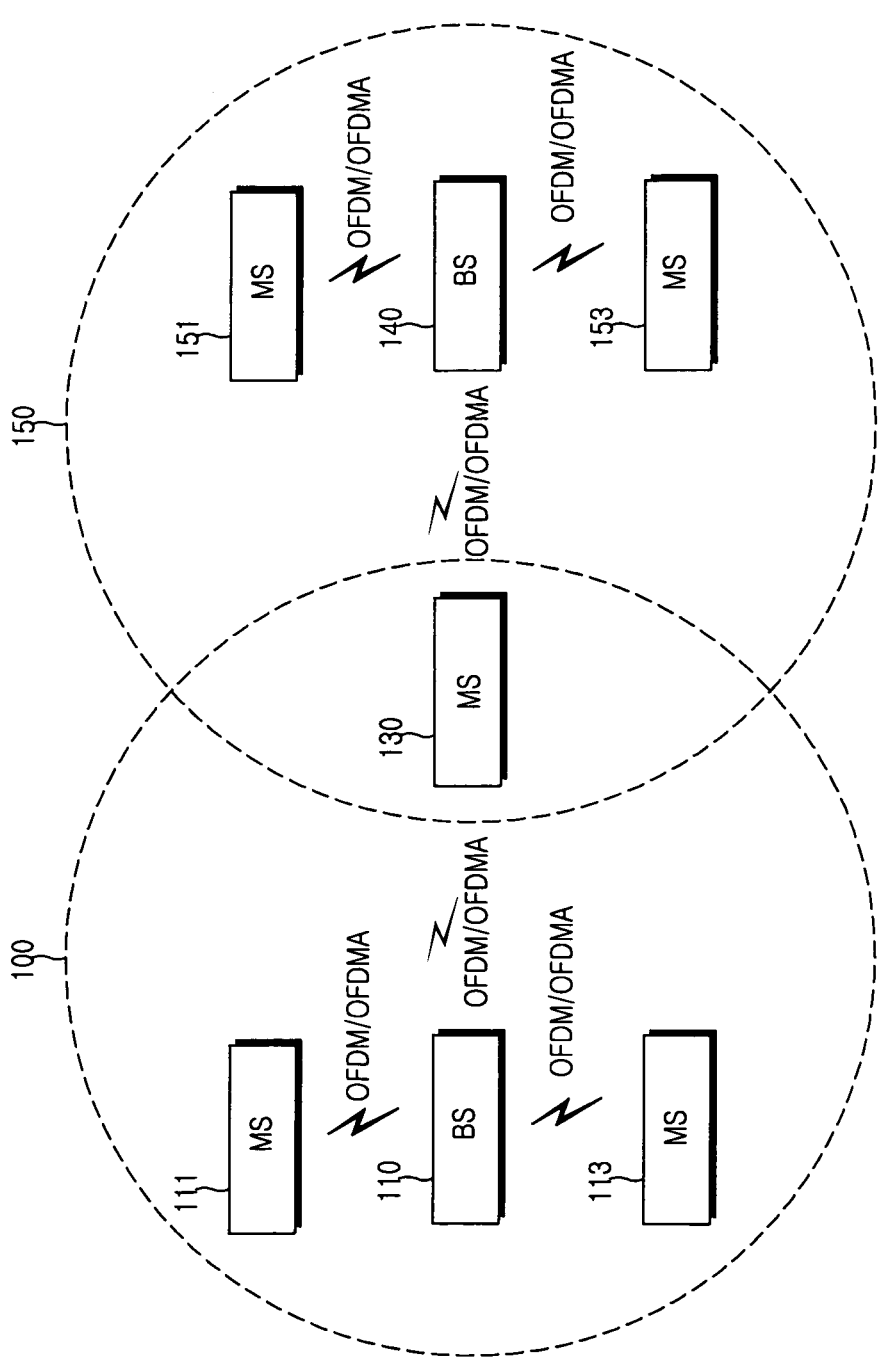
FIG. 1 illustrates a schematic structure of a conventional Institute of Electrical and Electronics Engineers (IEEE) 802.16e communication system.
Figure 2:
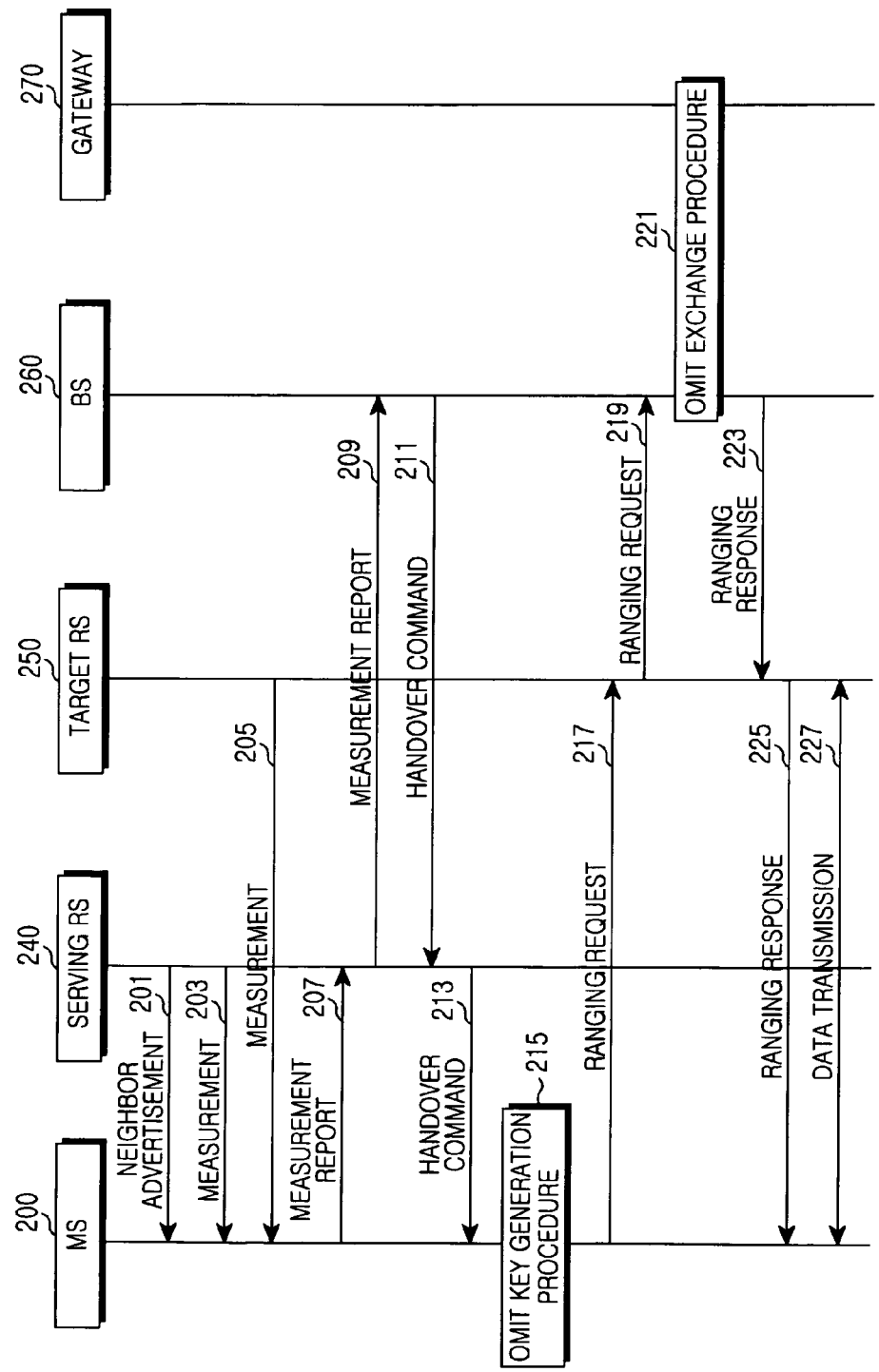
FIG. 2 illustrates a signal flow of a Mobile Station (MS) performing an intra-BS handover, a serving Relay Station (RS), a target RS, a Base Station (BS), and a gateway in a multi-hop relay broadband wireless communication system according to an embodiment of the present invention.

FIG. 2 is illustrates a signal flow of an MS 200 performing an intra-BS handover, a serving RS 240, a target RS 250, a BS 260, and a gateway 270 in a multi-hop relay broadband wireless communication system according to a an embodiment of the present invention.

Referring to FIG. 2, the MS 200 performs communication through the serving RS 240 that is a serving node and, in step 201, the MS 200 receives a neighbor advertisement message that is periodically transmitted by the serving RS 240. Here, the neighbor advertisement message includes information on a neighbor node (i.e., a neighbor BS or a neighbor RS). When the neighbor node is an RS, the neighbor advertisement message further includes information on an upper BS that controls the RS. The information on the neighbor node corresponds to a neighbor node identifier (ID), and the information on the upper BS of the neighbor node corresponds to a base station identifier (BSID). Here, the information on the upper BS that controls the RS can be included in the neighbor advertisement message itself but, when the neighbor advertisement message includes separate system configuration information (e.g., a Downlink Configuration Descriptor/Uplink Configuration Descriptor (DCD/UCD), a AAI System Configuration Descriptor (AAI_SCD)) of each neighbor node, the information on the upper BS can be included in the system configuration information.

In steps 203 and 205, the MS 200 performs a signal level measurement operation for the serving RS 240 and the neighbor node 250 (i.e., the neighbor BS or neighbor RS), which may be a target node. In step 207, the MS 200 generates a measurement report message including the signal level measurement result and sends the measurement report message to the serving RS 240. In step 209, the serving RS 240 forwards the measurement report message to the BS 260 that controls the MS 200. Here, steps 203 to 209 can be performed through a scanning procedure or a handover triggering procedure.

Afterwards, the BS 260 determines whether there is a need for the MS 200 to handover to the target RS 250 on the basis of the signal level measurement result of the MS 200. Upon determining the need to handover to the target RS 250, the BS 260 generates a handover command message to initiate a handover to the target RS 250 and sends the handover command message to the serving RS 240 in step 211. The handover command message includes information on the target RS 250 that is the target node. In step 213, the serving RS 240 forwards the handover command message to the MS 200.

The MS 200 acquires the information on the target RS 250 from the handover command message and identifies the information on the upper BS of the target RS 250, using the acquired information on the target RS 250 and the information on the neighbor node within the neighbor advertisement message that was received in step 201. Next, the MS 200 determines whether the upper BS of the target RS 250 is the same as an upper BS of the serving RS 240. If the upper BS of the target RS 250 is the same as the upper BS of the serving RS 240, i.e., if it is determined to be an intra-BS handover, the MS 200 recognizes that the MS 200 can use control information, which has previously been used in a communication with the serving RS 240, in the target RS 250 as is and, in step 215, the MS 200 omits a process of generating a key for use in the target RS 250. Alternatively, if the upper BS of the target RS 250 is different from the upper BS of the serving RS 240, i.e., if it is determined not to be the intra-BS handover, the MS 200 recognizes that the MS 200 cannot use, in the target RS 250, the control information that was previously used in the communication with the serving RS 240, and performs the process of generating the key to use in the target RS 250 according to a general handover procedure. The following description is made for situations in which the MS 200 determines that a handover is an intra-BS handover, and uses, in the target RS 250, control information that has previously been used in a communication with the serving RS 240 as is. Alternatively, although not illustrated, upon receiving the handover command message, the MS 200 can send a handover indication message, indicating that the MS 200 will perform a handover to the target RS 250, to the BS 260 through the serving RS 240.

In step 217, the MS 200 sends a ranging request message to the target RS 250 to perform a communication with the target RS 250. Here, the ranging request message includes information on a key that has previously been used in the communication with the serving RS 240. In step 219, the target RS 250 forwards the ranging request message to the BS 260.

Upon receiving the ranging request message, the BS 260 recognizes that the MS 200 is performing a handover to the target RS 250, which is managed by the BS 260, i.e., recognizes that the target RS 250 exists within the same BS and, thus, the BS 260 recognizes that there is no need to perform an exchange procedure of transmitting ID information of the MS 200 and BS 260 to the gateway 270 and receiving a response from the gateway 270. Thus, in step 221, the BS 260 omits the exchange procedure with the gateway 270. Here, the gateway is defined as an entity that includes a function for managing information on a key to be used by the MS in the target node.

In step 223, in response to the ranging request message of the MS 200, the BS 260 generates and sends a ranging response message to the target RS 250. In step 225, the target RS 250 forwards the ranging response message to the MS 200.

If a ranging request/response process ends as above, in step 227, the MS 200 can transmit/receive data with the target RS 250. At this time, the MS 200 can communicate with the target RS 250 using the same control information (i.e., a station ID, service flow and connection setting information, and a key), which was previously used to communicate with the serving RS 240.

The description of FIG. 2 applies for situations in which a serving node and a target node of an MS are RSs within the same BS, but an embodiment of the present invention is also applicable to situations in which the BS 260 is either a serving node or a target node.

Figure 3:
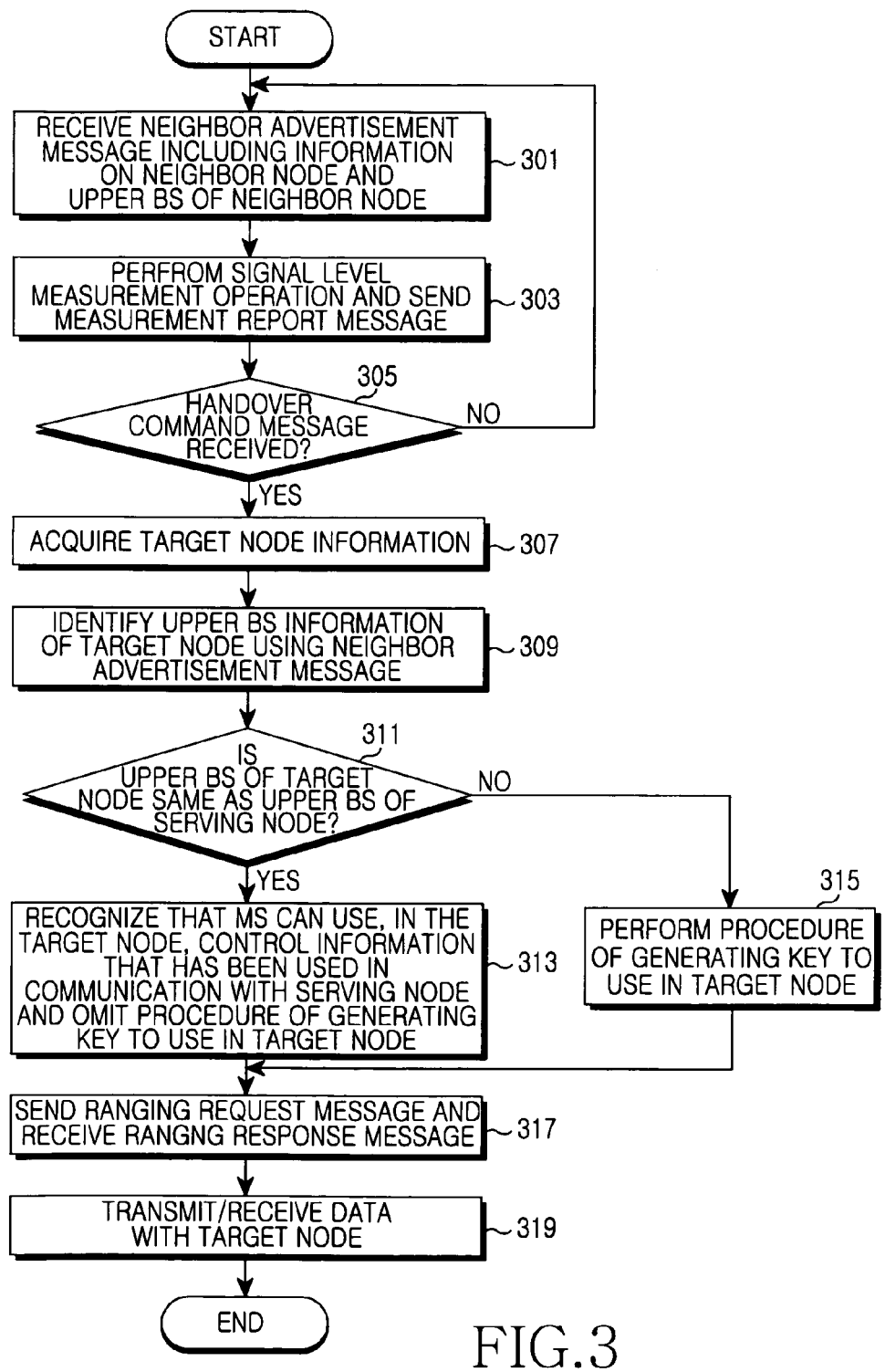
FIG. 3 illustrates an operation of an MS in a handover process in a multi-hop relay broadband wireless communication system according to an embodiment of the present invention.

FIG. 3 illustrates an operation of an MS in a handover procedure in a multi-hop relay broadband wireless communication system according to an embodiment of the present invention.

Referring to FIG. 3, the MS communicates through a serving node and, in block 301, the MS receives a neighbor advertisement message that is periodically transmitted by the serving node. Here, the serving node of the MS can be either an RS or a BS that controls the MS. For example, the RS is described below. Even when the serving node of the MS is an RS, a control of the MS is carried out by a serving BS of the RS. Here, the neighbor advertisement message includes information on a neighbor node (i.e., a neighbor BS or neighbor RS). When the neighbor node is an RS, the neighbor advertisement message further includes information on an upper BS that controls the RS.

In block 303, the MS performs a signal level measurement operation for the serving node and the neighbor node (i.e., the neighbor BS or neighbor RS) that can be a target node, generates a measurement report message including the signal level measurement result, and sends the measurement report message to the serving node.

In block 305, the MS determines whether a handover command message that initiates a handover to the target node is received from the serving node. Here, the handover command message includes information on the target node. If the handover command message is not received, the MS returns to block 301 and repeatedly performs the subsequent steps.

Alternatively, if the handover command message is received, in block 307, the MS acquires the information on the target node through the handover command message and, in block 309, the MS identifies information on an upper BS of the target node, using the acquired information on the target node and information on a neighbor node and an upper BS of the neighbor node within the neighbor advertisement message that was received in block 301.

In block 311, the MS determines whether the upper BS of the target node is the same as an upper BS of the serving node. If the upper BS of the target node is the same as the upper BS of the serving node, that is, if an intra-BS handover is detected, in block 313, the MS recognizes that the MS can use, in the target node, control information that has been used in communication with the serving node and omits a procedure of generating a key to use in the target node. Here, the control information includes a station ID, service flow and connection setting information, and a key. Alternatively, if the upper BS of the target node is different from the upper BS of the serving node, that is, if it is detected not to be the intra-BS handover, in block 315, the MS recognizes that the MS cannot use, in the target node, the control information that was used in the communication with the serving node and performs the procedure of generating the key to use in the target node.

Then, in block 317, the MS sends a ranging request message to the target node to perform a communication with the target node, and receives a ranging response message from the target node. In an intra-BS handover, the ranging request message includes information on a key that has been used in communication with the serving node. Alternatively, when the handover is not an intra-BS handover, the ranging request message includes information on a key generated to use in communication with the target node. Also, when the handover is not an intra-BS handover, the ranging response message includes information acquired from an exchange procedure between the BS and a gateway. In contrast, during an intra-BS handover, the exchange procedure between the BS and the gateway is omitted and, therefore, the ranging response message does not include the information acquired from the exchange procedure.

In block 319, the MS terminates the communication with the serving node, communicates with the target node, and transmits/receives data with the target node.

The MS then terminates the operation according to an embodiment of the present invention.

Figure 4:
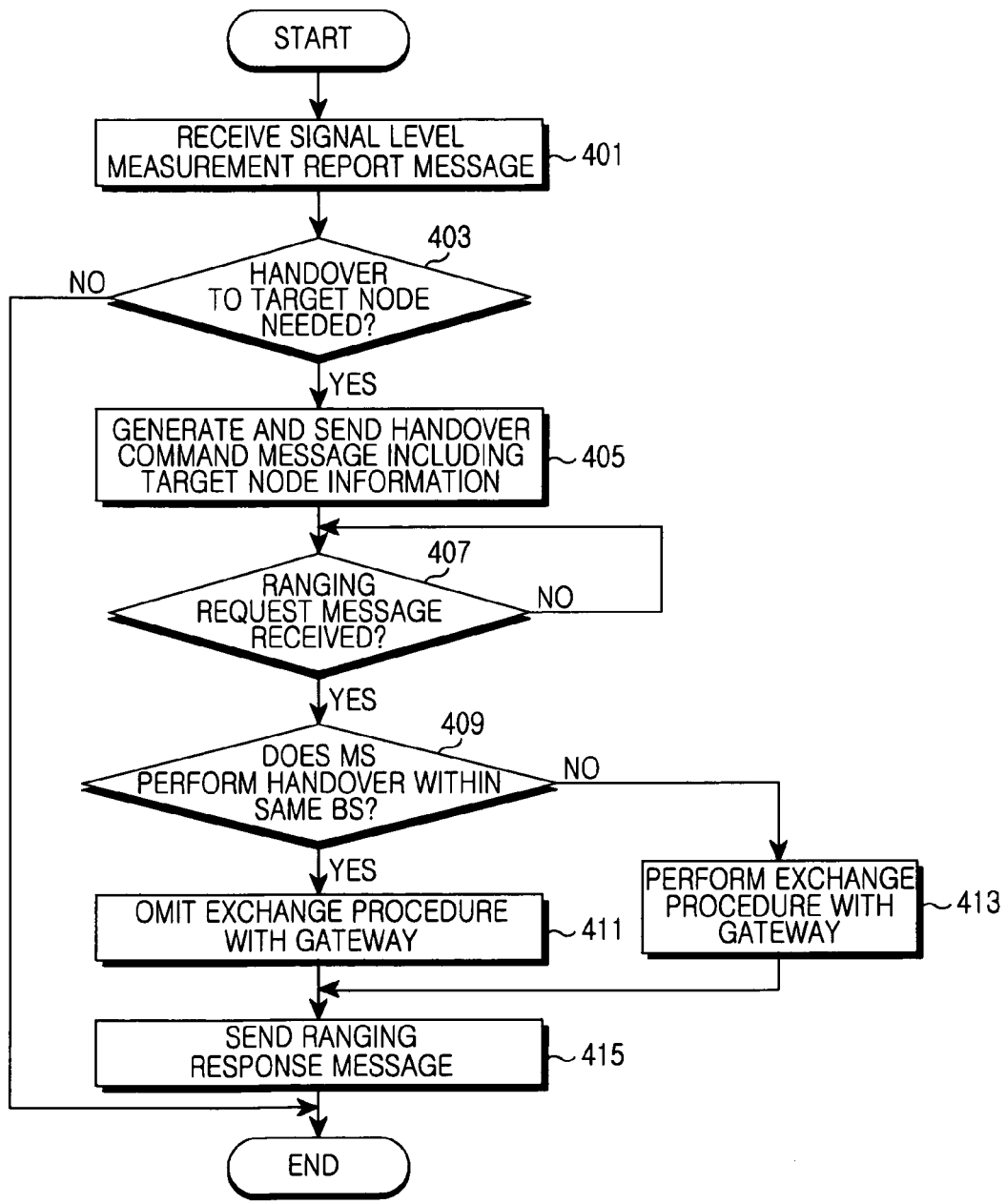
FIG. 4 illustrates an operation of a BS in a handover process in a multi-hop relay broadband wireless communication system according to an embodiment of the present invention.

FIG. 4 illustrates an operation of a BS in a handover process in a multi-hop relay broadband wireless communication system according to an embodiment of the present invention.

Referring to FIG. 4, in block 401, the BS receives a measurement report message that includes the signal level measurement result from an MS through a serving node of the MS. The serving node of the MS can be either an RS or a BS that controls the MS. For example, the RS is described below. Even when the serving node of the MS is an RS, a control of the MS is carried out by a serving BS of the RS.

In block 403, the BS determines whether there is a need for the MS to handover to a target node on the basis of the signal level measurement result of the MS. If there is no need to handover to the target node, the BS terminates the operation according to an embodiment of the present invention.

Alternatively, if there is the need to handover to the target node, in block 405, the BS generates a handover command message that initiates a handover to the target node and sends the handover command message to the MS through the serving node. The handover command message includes information on the target node.

After that, in block 407, the BS waits for a ranging request message from the MS through the target node. In an intra-BS handover, the ranging request message includes information on a key that has been used by the MS in communication with the serving node. If the handover is not an intra-BS handover, the ranging request message includes information on a key generated to be used by the MS in communication with the target node.

When the ranging request message is received, in block 409, the BS determines whether the MS performs a handover to the target node within the same BS based on the information included within the ranging request message. If the MS performs the handover to the target node within the same BS, in block 411, the BS recognizes that there is no need to perform an exchange procedure of transmitting ID information of the MS and the BS to a gateway and receiving a response from the gateway, and omits the exchange procedure with the gateway. Alternatively, if the MS perform a handover to the target node within the BS from a neighbor BS, in block 413, the BS performs the exchange procedure of transmitting the ID information of the MS and BS to the gateway and receiving the response from the gateway.

In block 415, the BS sends a ranging response message to the target node. If the handover is not an intra-BS handover, the ranging response message includes information acquired from the exchange procedure between the BS and the gateway. Alternatively, if the handover is an intra-BS handover, the exchange procedure between the BS and the gateway is omitted and, therefore, the ranging response message does not include the information acquired from the exchange procedure.

The BS then terminates the operation according to an embodiment of the present invention.

A method of transmitting information on an upper BS of an RS using a neighbor advertisement message is described above with reference to FIGS. 2 to 4. However, there may be a system that does not support the method of transmitting the information on the upper BS of the RS using the neighbor advertisement message. To support an MS that performs a handover within the same BS, the system can consider a way to include, in a handover command message provided to the MS, an indicator that indicates whether a target node to which the MS has to perform a handover exists within the same BS as that of the serving node. This method is described below with reference to FIGS. 5 to 7.

Figure 5:
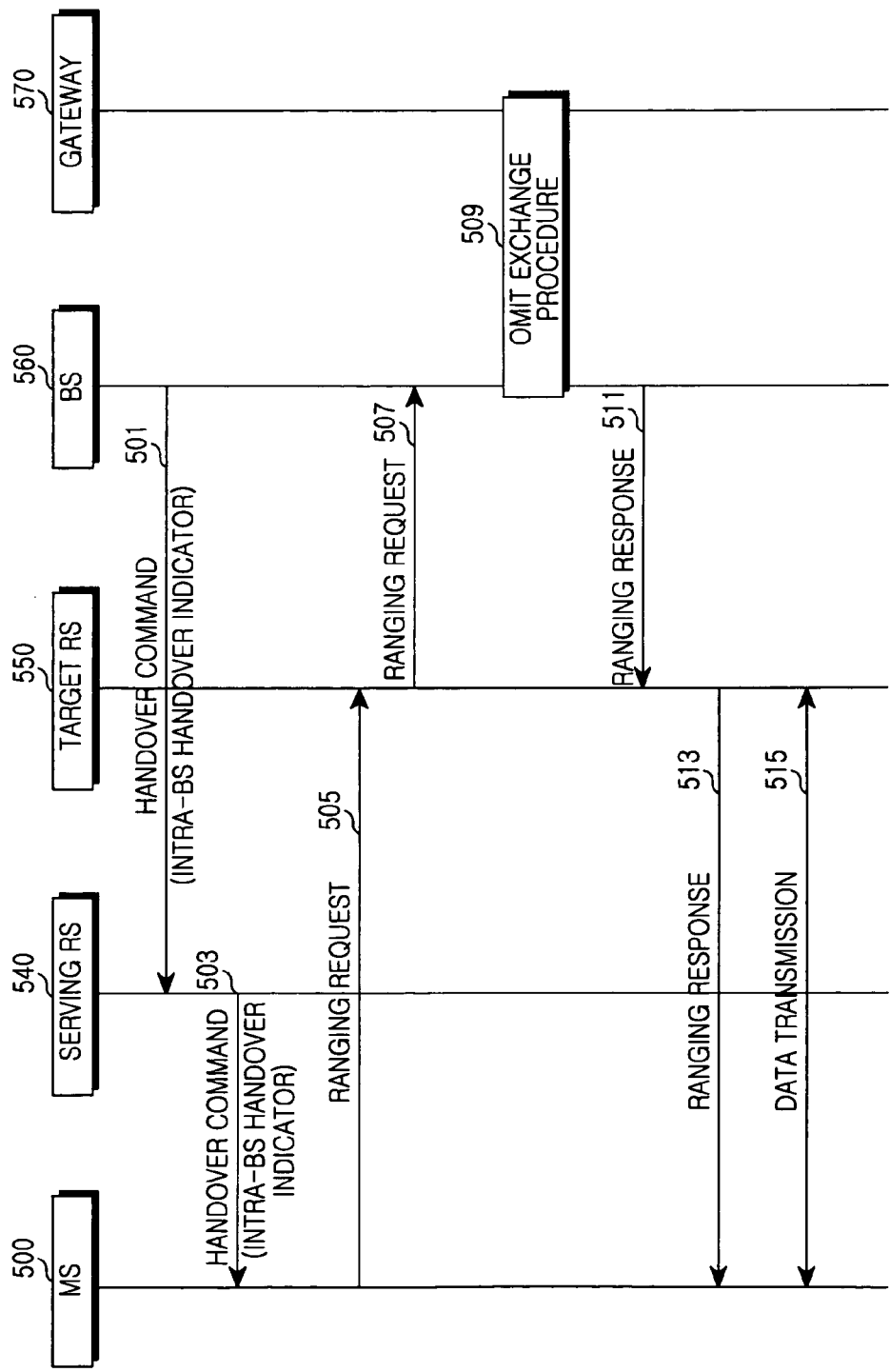
FIG. 5 illustrates a signal flow of an MS performing an intra-BS handover, a serving RS, a target RS, a BS, and a gateway in a multi-hop relay broadband wireless communication system according to an embodiment of the present invention.

FIG. 5 illustrates a signal flow of an MS 500 that performs an intra-BS handover, a serving RS 540, a target RS 550, a BS 560, and a gateway 570 in a multi-hop relay broadband wireless communication system according to an embodiment of the present invention.

Referring to FIG. 5, the MS 500 communicates through the serving RS 540 that is a serving node. During this time, the BS 560 that controls the MS 500 determines whether there is a need for the MS 500 to handover to the target RS 550. If there is the need to handover to the target RS 550, the BS 560 determines whether the target RS 550 exists within the same BS. If the target RS 550 exists within the BS 560, the BS 560 sets an indicator to indicate that the BS 560 manages the target RS 550, i.e. sets an intra-BS handover indicator to '1' and, in step 501, the BS 560 generates and sends a handover command message to the serving RS 540. The handover command message includes information on the target RS 550, to which the MS 500 intends to perform a handover, and the set intra-BS handover indicator.

Alternatively, if the target RS 550 does not exist within the BS 560, the BS 560 sets the intra-BS handover indicator to '0' and generates and sends a handover command message to the serving RS 540. The handover command message includes information on the target RS 550, to which the MS 500 intends to perform a handover, and the intra-BS handover indicator. If the target RS 550 does not exist within the BS 560 (that is, exists in a cell of a neighbor BS) while the target RS 550 is a neighbor RS, the BS 560 further includes information on an upper BS of the target RS 550 in the handover command message, and sends the handover command message to the serving RS 540. That is, if the target RS 550 is the neighbor RS under the management of the neighbor BS, the BS 560 further includes ID information of the neighbor BS, which corresponds to the upper BS of the neighbor RS, in the handover command message, and sends the handover command message to the serving RS 540. In step 503, the serving RS 540 forwards the handover command message to the MS 500.

Here, the intra-BS handover indicator included in the handover command message can be configured as shown in Table 1, below.

TABLE 1

| Field | Size | Description |
|---|---|---|
| Intra-BS handover indicator | 1 | Indicate a target access node is under the control of serving BS<br>0: a target access node is under a different BS<br>1: a target access node is under the same BS |

As shown in Table 1, if the intra-BS handover indicator included in the handover command message is set to '1', the MS 500 receiving this can be aware that the target RS 550 for handover is either a serving BS or an RS managed by the serving BS. Also, if the intra-BS handover indicator included in the handover command message is set to '0', the MS 500 receiving this can be aware that the target RS 550 for handover is either a neighbor BS or an RS managed by the neighbor BS.

If the intra-BS handover indicator is set to '0', this indicates that the target RS 550 exists within a neighbor BS and, thus, the MS 500 receiving this has to generate a new key information to use in the target RS 550. The handover command message can also include an ID of the upper BS of the target RS 550.

Upon receiving the handover command message, the MS 500 determines whether the intra-BS handover indicator included in the handover command message is set to '1'. If the intra-BS handover indicator is set to '1', the MS 500 determines that the handover is an intra-BS handover, recognizes that the MS 500 can use, in the target RS 550, control information that has previously been used in a communication with the serving RS 540 and omits a procedure of generating a key to use in the target RS 550.

Alternatively, if the intra-BS handover indicator is set to '0', the MS 500 recognizes that the handover is a handover to a neighbor BS cell, recognizes that the MS 500 cannot the use, in the neighbor BS cell, control information that was used in communication with the serving RS 540 and performs the procedure of generating the key to use in the target RS 550. If the handover command message includes the information on the upper BS of the target RS 550, the MS 500 recognizes that the handover is a handover to an RS within a neighbor BS and performs a procedure of generating a key to use in the target RS 550 using the information on the upper BS of the target RS 550. Alternatively, if the handover command message does not include the information on the upper BS of the target RS 550, the MS 500 recognizes that the handover is a handover to a neighbor BS, and performs a procedure of generating a key to use in a target BS based on information on the neighbor BS. Although not illustrated, upon receiving the handover command message, the MS 500 can send a handover indication message, which indicates that the MS 500 will perform a handover to the target RS 550, to the BS 560 through the serving RS 540.

Subsequent steps 505 to 515 are as analogous to steps 217 to 227 of FIG. 2.

Figure 6:
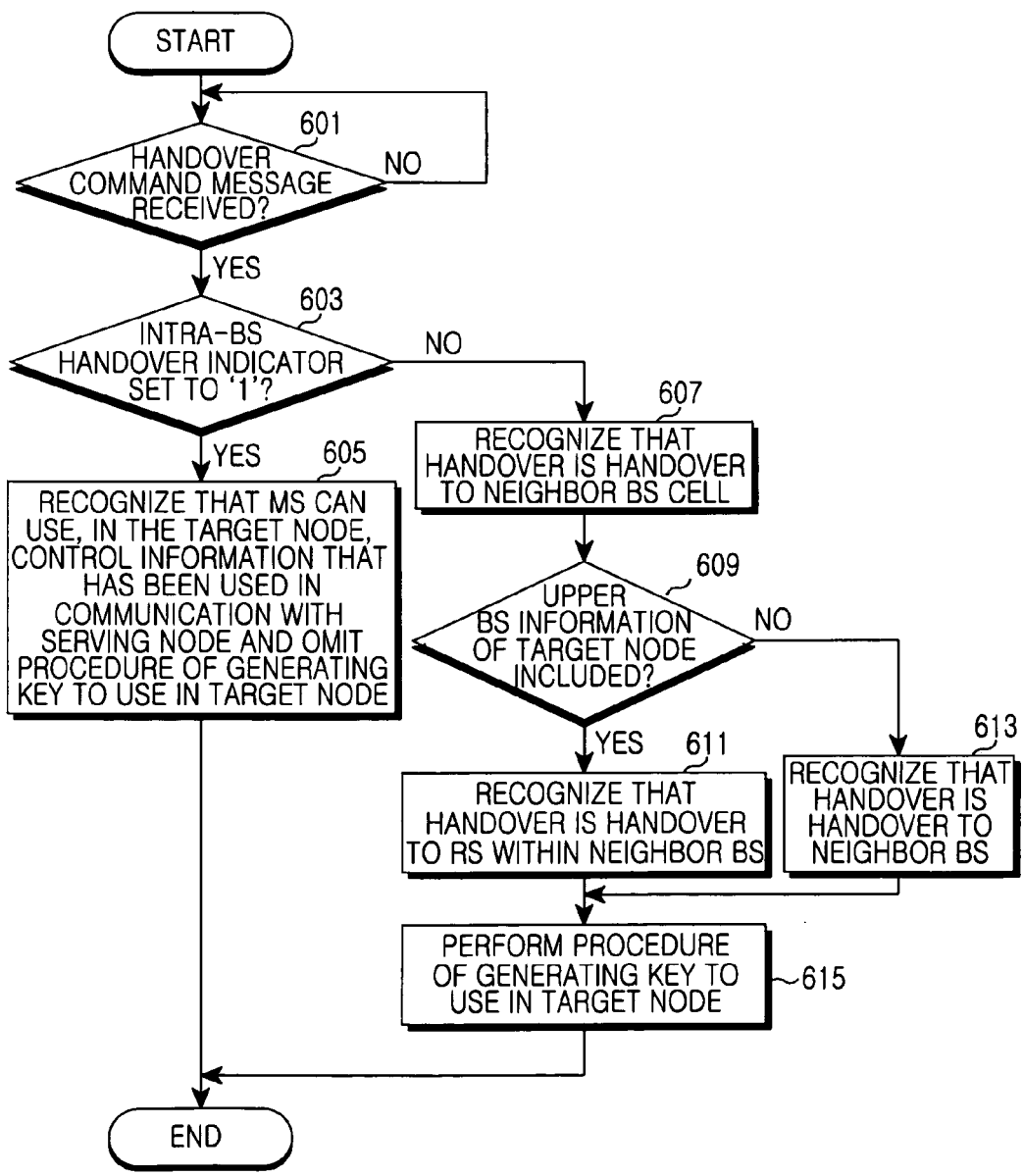
FIG. 6 illustrates an operation of an MS in a handover process in a multi-hop relay broadband wireless communication system according to an embodiment of the present invention.

FIG. 6 illustrates an operation of an MS in a handover procedure in a multi-hop relay broadband wireless communication system according to an embodiment of the present invention.

Referring to FIG. 6, the MS performs communication through a serving node and, in block 601, the MS determines if a handover command message that initiates a handover to a target node is received from the serving node. The handover command message includes information on the target node, to which the MS intends to perform a handover, and an intra-BS handover indicator. In a handover to an RS within a neighbor BS, the handover command message further includes information on an upper BS of the target node.

If the handover command message is received, in block 603, the MS determines whether the intra-BS handover indicator included in the handover command message is set to '1'. If the intra-BS handover indicator is set to '1', in block 605, the MS determines that the handover is an intra-BS handover, recognizes that the MS can use, in the target node, control information that has been used in communication with the serving node, and omits a procedure of generating a key to use in the target node.

Alternatively, if the intra-BS handover indicator is set to '0', in block 607, the MS recognizes that the handover is a handover to a neighbor BS cell, recognizes that the MS cannot use, in the target node, the control information which was used in communication with the serving node, and performs the procedure of generating the key to use in the target node. In block 609, the MS determines whether the handover command message includes the information on the upper BS of the target node. If the handover command message includes the information on the upper BS of the target node, in block 611, the MS recognizes that the handover is a handover to an RS within a neighbor BS. Then, in block 615, the MS performs a procedure of generating a key to use in the target node using the information on the upper BS of the target node. Alternatively, if the handover command message does not include the information on the upper BS of the target node, in block 613, the MS recognizes that the handover is a handover to a neighbor BS. Then, in block 615, the MS performs a procedure of generating a key to use in the target node using information on the neighbor BS.

Subsequently, although not illustrated, the MS performs the same process as blocks 317 and 319 of FIG. 3. Then, the MS terminates the operation according to an embodiment of the present invention.

Figure 7:
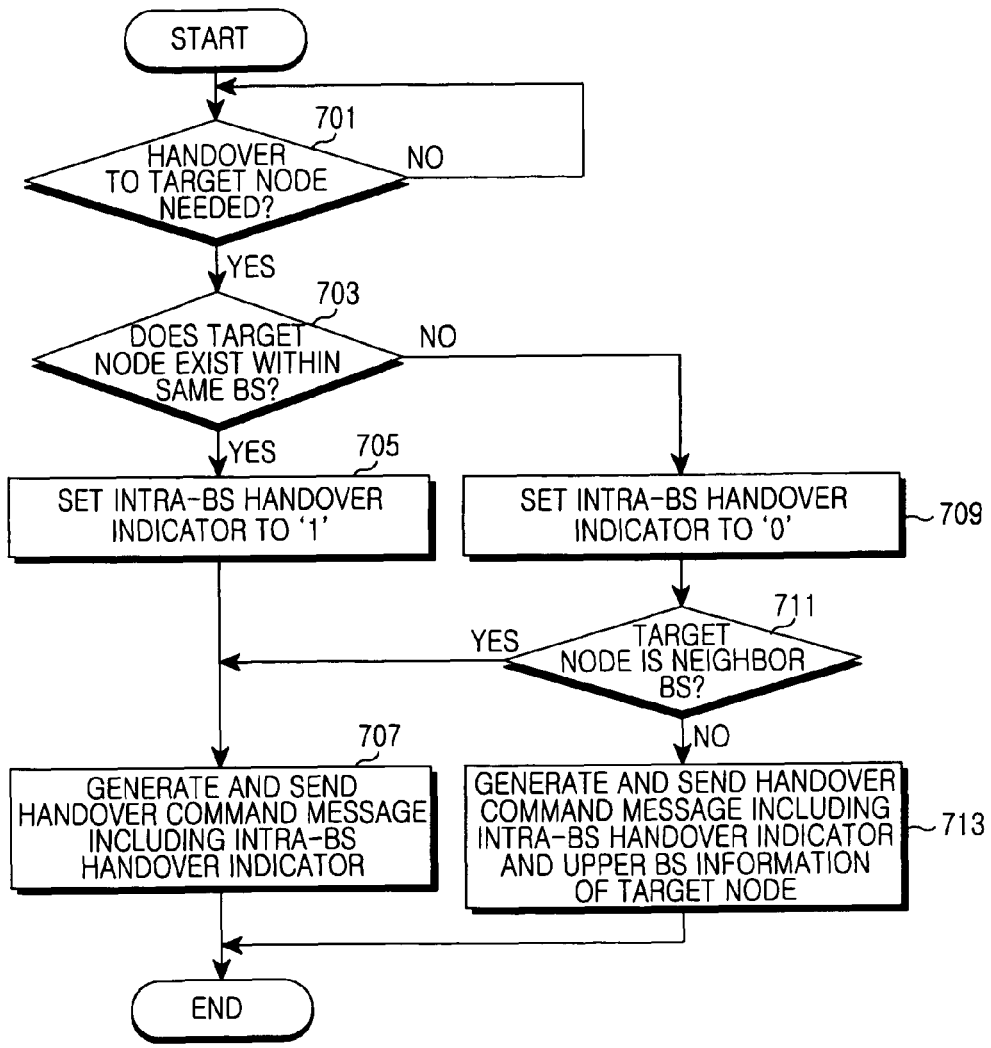
FIG. 7 illustrates an operation of a BS in a handover process in a multi-hop relay broadband wireless communication system according to an embodiment of the present invention.

FIG. 7 illustrates an operation of a BS in a handover procedure in a multi-hop relay broadband wireless communication system according to an embodiment of the present invention.

Referring to FIG. 7, in block 701, the BS determines whether there is a need for an MS to handover to a target node. If there is the need to handover to the target node, in block 703, the BS determines whether the target node exists within the same BS.

If the target node exists within the same BS, in block 705, the BS sets an intra-BS handover indicator to '1'. In block 707, the BS generates and sends a handover command message to a serving node of the MS. Here, the handover command message includes information on the target node, to which the MS intends to perform a handover, and the intra-BS handover indicator. The serving node of the MS can be either an RS or a BS that controls the MS. For example, the RS is described below. Even when the serving node of the MS is an RS, a control of the MS is carried out by a serving BS of the RS.

Alternatively, if the target node does not exist within the same BS, in block 709, the BS sets the intra-BS handover indicator to '0'. In block 711, the BS determines whether the target node is a neighbor BS. If the target node is the neighbor BS, the BS proceeds to block 707 and generates and sends a handover command message to the serving node. Here, the handover command message includes information on the target node, to which the MS intends to perform a handover, and the intra-BS handover indicator. Alternatively, if the target node is a neighbor RS, in block 713, the BS generates and sends a handover command message to the serving node. Here, the handover command message includes information on an upper BS of the target node along with information on the target node, to which the MS intends to perform a handover, and the intra-BS handover indicator.

After that, although not illustrated, the BS performs the same process as blocks 407 to 415 of FIG. 4. The BS then terminates the operation according to an embodiment of the present invention.

The above description is for a method in which an MS distinguishes an RS and a BS, so as to support a handover of the MS, and receives information on an upper BS of the RS through a serving node. In the above description, the upper BS information of the RS acquired by the MS can be used to indicate that the MS exists within the same BS. In contrast, when the MS generates a key based on the upper BS information (i.e., a BSID) and stays in the BS or the RS managed by the BS, the upper BS information of the RS can be used such that the MS can continuously communicate using the key generated based on the BSID. The upper BS information of the RS can be acquired through system configuration information (i.e., a DCD/UCD, a AAI_SCD) that the MS receives from a serving RS in the midst of performing an initial network entry procedure. Even in a process in which the MS enters an idle mode and performs a network re-entry procedure, the upper BS information of the RS can also be acquired through the system configuration information (i.e., the DCD/UCD, the AAI_SCD). As described above, the upper BS information of the RS that is acquired through the system configuration information (i.e., the DCD/UCD, the AAI_SCD) in the initial network entry procedure and network re-entry procedure process is used to generate key information to be used by the MS in the serving RS.

Figure 8:
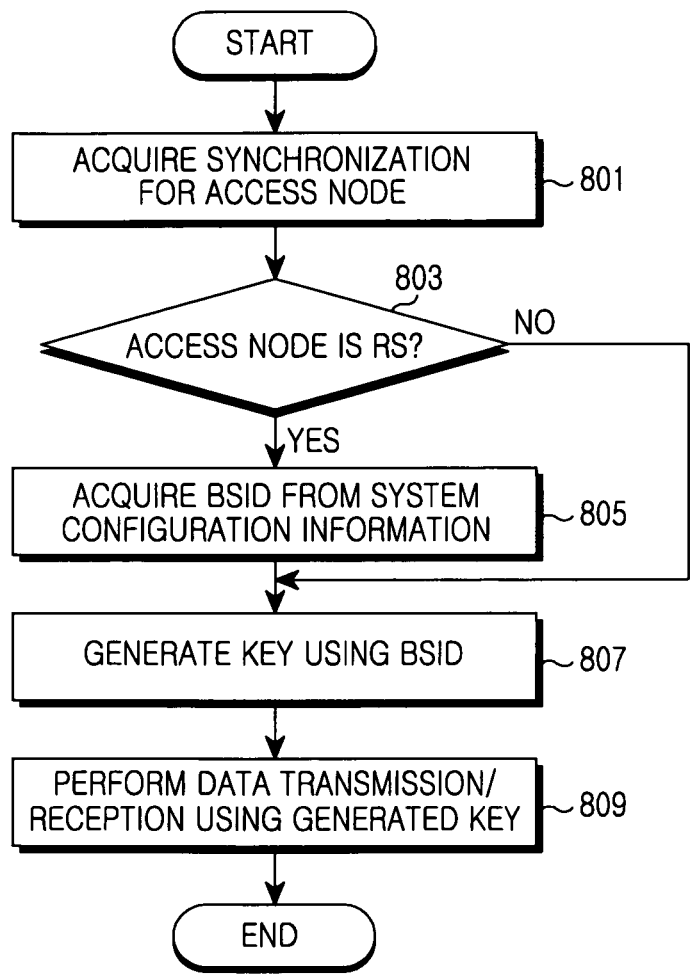
FIG. 8 illustrates an operation of an MS in an initial network entry process and network re-entry process in a multi-hop relay broadband wireless communication system according to an embodiment of the present invention.

FIG. 8 illustrates an operation of an MS in an initial network entry procedure and network re-entry procedure in a multi-hop relay broadband wireless communication system according to an embodiment of the present invention.

Referring to FIG. 8, in block 801, the MS registers to a network, searches an access node for performing data transmission/reception, and acquires a synchronization for the searched access node. The access node corresponds to a BS or an RS. In the following description, if the access node is the BS, the access node will be referred to as access BS and, if the access node is the RS, the access node will be referred to as an access RS.

In block 803, the MS determines whether the access node is an RS. If the access node is the RS, in block 805, the MS acquires BSID information on an upper BS of the access RS from system configuration information (i.e., a DCD/UCD, a AAI_SCD) transmitted by the access RS and then, the MS proceeds to block 807. Alternatively, if the access node is a BS, the MS proceeds directly to block 807 because the MS only needs the BSID of the access BS without needing to acquire upper BS information.

In block 807, the MS generates a key to use in communication with the access node (i.e., the RS or the BS) using the BSID of the upper BS of the access RS or the BSID of the access BS.

In block 809, the MS performs data transmission/reception through the access node (i.e., the RS or the BS) using the generated key.

The upper BS ID information included in system configuration information or a handover command message or neighbor advertisement message can be configured as shown in Table 2, below.

TABLE 2

| Field | Size | Description |
|---|---|---|
| Superordinate BS MAC ID | 48 bit (TBD) | MAC ID (MAC address) of base station that controls this relay station. |

Table 2 applies to situations in which an MS generates a key to communicate using information (i.e., a BSID) on an upper BS. In contrast, when an MS generates the key using an ID of a current serving node (i.e., an RS or a BS), the MS does not need to acquire the information on the upper BS. Although the MS performs a handover within the same BS, the key information is updated according to an ID of a new target node, and control information other than the key, i.e., a station ID and service flow and connection setting related information, are continuously maintained irrespective of a handover of the MS. Thus, when indicating whether the MS performs a handover within the same BS using a handover command message as illustrated in FIGS. 5 to 7, a BS can provide to an MS, which performs a handover to a target node, an intra-BS handover indicator using the handover command message to inform that the MS does not need to update a station ID and service flow and connection setting related information. At this time, upper BS information of the target node does not have to be provided.

As described above, an embodiment of the present invention allows, when an MS capable of distinguishing an RS and a BS performs an intra-BS handover, continuously using control information that has been used by the MS in communication with a serving node, in communication with a target node without changing the control information within the same BS. The benefits include providing a seamless service to the MS, omitting an unnecessary control information update procedure dependent on handover, and reducing a signaling overhead of exchanging the control information of the MS in a multi-hop relay broadband wireless communication system.

Although the present disclosure has been described with an embodiment, various changes and modifications may be suggested to one skilled in the art. It is intended that the present disclosure encompass such changes and modifications as fall within the scope of the appended claims.

What is claimed is:

1. A multi-hop relay wireless communication system comprising:
   a base station (BS) configured to:
      determine, based on a measurement report received from a mobile station (MS), that there is a need for the MS to handover from a serving relay station (RS) to a target RS,
      determine whether the serving RS and the target RS exist within the BS,
      generate a handover command message comprising an indicator that indicates whether the serving RS and the target RS exist within the BS, and
      transmit the handover command message to the serving RS,
   wherein the serving RS is configured to receive the handover command message from the BS, and transmit the handover command message to the MS, and
   wherein the MS is configured to:
      receive the handover command message from the serving RS,
      recognize an ability for the MS to use a control information for a communication with the target RS, wherein the control information has previously been used in a communication with the serving RS, based on the indicator of the handover command message, and upon recognition of the ability for the MS to use the control information for the communication with the target RS, use a key in the target RS, wherein the key was previously used in a prior communication.

2. The system of claim 1, wherein the handover command message comprises the indicator and information of the target RS.

3. The system of claim 1, wherein the control information comprises at least one of a key used when performing the communication between the serving RS and the MS, a station identifier (ID) of the MS, and a service flow and connection setting information.

4. The system of claim 1, wherein the MS is further configured to transmit a ranging request message to the target RS, the ranging request message including information on a key that has previously been used in a communication between the serving RS and the MS, and wherein the target RS is configured to receive the ranging request message from the MS, and transmit the ranging request message to the BS.

5. The system of claim 4, wherein the BS is further configured to receive the ranging request message from the target RS; upon receiving the ranging request message, recognize that there is no need to perform an exchange procedure of transmitting the control information of the MS to a gateway, and omit the exchange procedure with the gateway; and transmit a ranging response message to the target RS, in response to the ranging request message, wherein the target RS is further configured to receive the ranging response message from the BS, and transmit the ranging response message to the MS, and wherein the MS is further configured to receive the ranging response message from the target RS, in response to the ranging request message.

6. A method for performing a handover in a multi-hop relay wireless communication system including a base station (BS), a serving relay station (RS), a target RS, and a mobile station (MS), the method comprising:

determining, at the BS based on a measurement report received from a mobile station (MS), that there is a need for the MS to handover from the serving RS to the target RS;

determining, at the BS, whether the serving RS and the target RS exist within the BS;

generating, at the BS, a handover command message comprising an indicator that indicates whether the serving RS and the target RS exist within the BS;

transmitting, at the BS, the handover command message to the serving RS;

receiving, at the serving RS, the handover command message from the BS;

transmitting, at the serving RS, the handover command message to the MS;

receiving, at the MS, the handover command message from the serving RS;

recognizing, at the MS, an ability for the MS to use a control information for a communication with the target RS, the control information that has previously been used in a communication with the serving RS, based on the indicator of the handover command message; and upon recognition of the ability for the MS to use the control information for the communication with the target RS, using, at the MS, a key to use in the target RS, wherein the key was previously used in a prior communication.

7. The method of claim 6, wherein the handover command message comprises the indicator and information of the target RS.

8. The method of claim 6, wherein the control information comprises at least one of a key used when performing the communication between the serving RS and the MS, a station identifier (ID) of the MS, and a service flow and connection setting information.

9. The method of claim 6, further comprising:

transmitting, at the MS, a ranging request message to the target RS, the ranging request message including information on a key that has previously been used in a communication between the serving RS and the MS;

receiving, at the target RS, the ranging request message from the MS; and transmitting, at the target RS, the ranging request message to the BS.

10. The method of claim 9, further comprising:

receiving, at the BS, the ranging request message from the target RS;

upon receiving the ranging request message, recognizing, at the BS, that there is no need to perform an exchange procedure of transmitting the control information of the MS to a gateway;

omitting, at the BS, the exchange procedure with the gateway;

transmitting, at the BS, a ranging response message to the target RS, in response to the ranging request message;

receiving, at the target RS, the ranging response message from the BS;

transmitting, at the target RS, the ranging response message to the MS; and receiving, at the MS, the ranging response message from the target RS, in response to the ranging request message.

* * * * *